United States Patent
Clouqueur et al.

(10) Patent No.: US 12,153,927 B2
(45) Date of Patent: Nov. 26, 2024

(54) MERGED BRANCH TARGET BUFFER ENTRIES

(71) Applicant: ADVANCED MICRO DEVICES, INC., Santa Clara, CA (US)

(72) Inventors: Thomas Clouqueur, Boxborough, MA (US); Marius Evers, Santa Clara, CA (US); Aparna Mandke, Bangalore (IN); Steven R. Havlir, Austin, TX (US); Robert Cohen, Austin, TX (US); Anthony Jarvis, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/889,010

(22) Filed: Jun. 1, 2020

(65) Prior Publication Data
US 2021/0373896 A1    Dec. 2, 2021

(51) Int. Cl.
*G06F 9/38* (2018.01)
*G06F 9/48* (2006.01)

(52) U.S. Cl.
CPC .......... *G06F 9/3804* (2013.01); *G06F 9/3836* (2013.01); *G06F 9/3844* (2013.01); *G06F 9/48* (2013.01)

(58) Field of Classification Search
CPC .... G06F 9/3806; G06F 9/3844; G06F 9/3836; G06F 9/3804
See application file for complete search history.

(56) References Cited

U.S. PATENT DOCUMENTS

| | | | |
|---|---|---|---|
| 5,434,985 A | 7/1995 | Emma et al. | |
| 5,774,710 A * | 6/1998 | Chung | G06F 9/3806 712/23 |
| 2006/0218385 A1 * | 9/2006 | Smith | G06F 9/3806 712/238 |
| 2008/0148028 A1 * | 6/2008 | Grandou | G06F 9/3844 712/238 |
| 2009/0177875 A1 * | 7/2009 | Moyer | G06F 9/322 712/238 |
| 2018/0060073 A1 * | 3/2018 | Havlir | G06F 9/3806 |
| 2019/0065205 A1 | 2/2019 | Lin | |
| 2019/0369999 A1 * | 12/2019 | Evers | G06F 9/3844 |
| 2019/0384612 A1 | 12/2019 | Evers et al. | |

OTHER PUBLICATIONS

International Search Report and Written Opinion, PCT/US2021/034922, Aug. 12, 2021, 11 pages.

* cited by examiner

*Primary Examiner* — Jacob Petranek (57) ABSTRACT

Merging branch target buffer entries includes maintaining, in a branch target buffer, an entry corresponding to first branch instruction, where the entry identifies a first branch target address for the first branch instruction and a second branch target address for a second branch instruction; and accessing, based on the first branch instruction, the entry.

27 Claims, 7 Drawing Sheets

MERGED BRANCH TARGET BUFFER ENTRIES

BACKGROUND

A branch target predictor predicts the target of a branch instruction before the target of the branch instruction is computed by an execution unit of the processor. The branch target predictor maintains a branch target buffer to store previously computed branch information indexed according to their corresponding branch instruction.

DETAILED DESCRIPTION

In some embodiments, a method of merged branch target buffer includes maintaining, in a branch target buffer, an entry corresponding to first branch instruction, wherein the entry identifies a first branch target address for the first branch instruction and a second branch target address for a second branch instruction; and accessing, based on the first branch instruction, the entry.

In some embodiments, the method includes storing, based on the entry, data indicating the first branch target address and the second branch target address in a prediction queue. In some embodiments, the prediction queue is communicatively coupled to an instruction fetch unit configured to load, based on the first branch target address and the second branch target address, a plurality of instructions. In some embodiments, the method further includes: receiving a first redirect indicating the first branch instruction and the first branch target address; and storing, in the branch target buffer, the entry as identifying the first branch target address. In some embodiments, the method includes receiving a second redirect indicating the second branch instruction and the second branch target address; and modifying the entry to identify the second branch target address and the first branch target address. In some embodiments, the method includes determining, based on one or more merging rules, to modify the entry to identify the second branch target address and the first branch target address. In some embodiments, the one or more merging rules are based on at least one of: a branch type for the first branch instruction, a branch type for the second branch instruction, a prediction window for the first branch instruction, or an instruction address for the second branch instruction. In some embodiments, determining to modify the entry to identify the second branch target address and the first branch target address is further based on a number of bits required to identify, in the entry, the first branch target address and the second branch target address.

In some embodiments, a branch target predictor for merged branch target buffer entries performs steps including: maintaining, in a branch target buffer, an entry corresponding to first branch instruction, wherein the entry identifies a first branch target address for the first branch instruction and a second branch target address for a second branch instruction; and accessing, based on the first branch instruction, the entry.

In some embodiments, the steps further include storing, based on the entry, data indicating the first branch target address and the second branch target address in a prediction queue. In some embodiments, the prediction queue is communicatively coupled to an instruction fetch unit loads, based on the first branch target address and the second branch target address, a plurality of instructions. In some embodiments, the steps further include: receiving a first redirect indicating the first branch instruction and the first branch target address; and storing, in the branch target buffer, the entry as identifying the first branch target address. In some embodiments, the steps further include receiving a second redirect indicating the second branch instruction and the second branch target address; and modifying the entry to identify the second branch target address and the first branch target address. In some embodiments, the steps further include determining, based on one or more merging rules, to modify the entry to identify the second branch target address and the first branch target address. In some embodiments, the one or more merging rules are based on at least one of: a branch type for the first branch instruction, a branch type for the second branch instruction, a prediction window for the first branch instruction, or an instruction address for the second branch instruction. In some embodiments, determining to modify the entry to identify the second branch target address and the first branch target address is further based on a number of bits required to identify, in the entry, the first branch target address and the second branch target address.

In some embodiments, a processor for merged branch target buffer entries includes: a branch target predictor that performs steps including: maintaining, in a branch target buffer, an entry corresponding to first branch instruction, wherein the entry identifies a first branch target address for the first branch instruction and a second branch target address for a second branch instruction; and accessing, based on the first branch instruction, the entry.

In some embodiments, the steps further include storing, based on the entry, data indicating the first branch target address and the second branch target address in a prediction queue. In some embodiments, the processor further includes an instruction fetch unit that loads, based on the first branch target address and the second branch target address, a plurality of instructions, and the prediction queue is communicatively coupled to the instruction fetch unit. In some embodiments, the steps further include: receiving a first redirect indicating the first branch instruction and the first branch target address; and storing, in the branch target buffer, the entry as identifying the first branch target address. In some embodiments, the steps further include receiving a second redirect indicating the second branch instruction and the second branch target address; and modifying the entry to identify the second branch target address and the first branch target address. In some embodiments, the steps further include determining, based on one or more merging rules, to modify the entry to identify the second branch target address and the first branch target address. In some embodiments, the one or more merging rules are based on at least one of:

a branch type for the first branch instruction, a branch type for the second branch instruction, a prediction window for the first branch instruction, or an instruction address for the second branch instruction. In some embodiments, determining to modify the entry to identify the second branch target address and the first branch target address is further based on a number of bits required to identify, in the entry, the first branch target address and the second branch target address.

In some embodiments, an apparatus for merged branch target buffer entries includes: a processor including a branch target predictor that performs steps including: maintaining, in a branch target buffer, an entry corresponding to first branch instruction, wherein the entry identifies a first branch target address for the first branch instruction and a second branch target address for a second branch instruction; and accessing, based on the first branch instruction, the entry.

In some embodiments, the steps further include storing, based on the entry, data indicating the first branch target address and the second branch target address in a prediction queue. In some embodiments, the processor further includes an instruction fetch unit that loads, based on the first branch target address and the second branch target address, a plurality of instructions, and the prediction queue is communicatively coupled to the instruction fetch unit. In some embodiments, the steps further include: receiving a first redirect indicating the first branch instruction and the first branch target address; and storing, in the branch target buffer, the entry as identifying the first branch target address. In some embodiments, the steps further include receiving a second redirect indicating the second branch instruction and the second branch target address; and modifying the entry to identify the second branch target address and the first branch target address. In some embodiments, the steps further include determining, based on one or more merging rules, to modify the entry to identify the second branch target address and the first branch target address. In some embodiments, the one or more merging rules are based on at least one of: a branch type for the first branch instruction, a branch type for the second branch instruction, a prediction window for the first branch instruction, or an instruction address for the second branch instruction. In some embodiments, determining to modify the entry to identify the second branch target address and the first branch target address is further based on a number of bits required to identify, in the entry, the first branch target address and the second branch target address.

Figure 1:
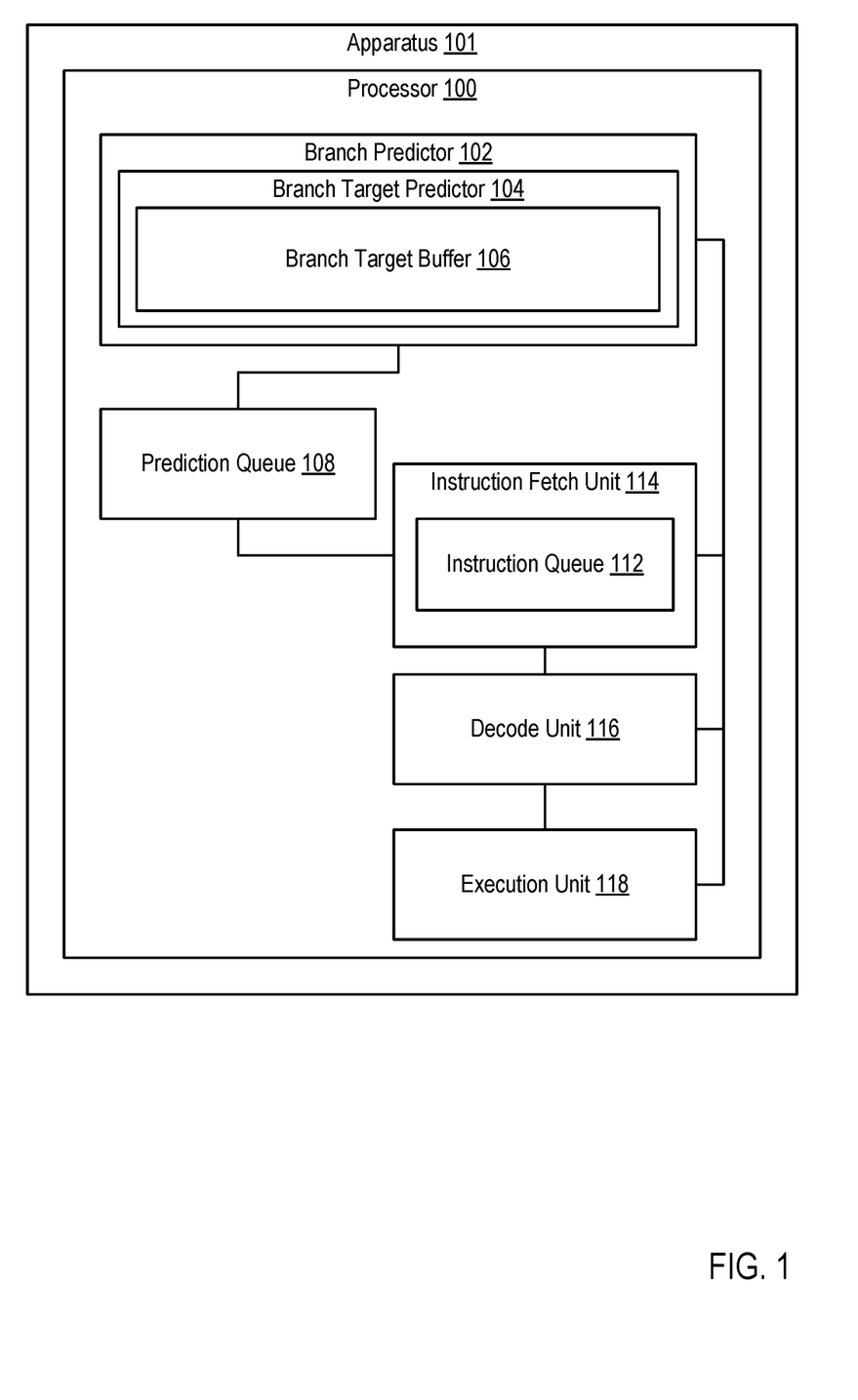
FIG. 1 is a block diagram of an example processor for merged branch target buffer entries according to some embodiments.

FIG. 1 is a block diagram of a non-limiting example of a device or apparatus 101 that includes a processor 100. The device 1 and/or processor 100 may implement various embodiments of the invention. Example processor 100 can be included in a variety of devices 1, including mobile devices, personal computers, peripheral hardware components, gaming devices, set-top boxes, and the like. The processor 100 includes a branch predictor 102. The branch predictor 102 is a combination of logic and/or circuitry that predicts which direction or path a branch instruction will take prior to execution. The branch predictor 102 includes a branch target predictor 104. The branch target predictor 104 is a combination of logic and/or circuitry that predicts the target address of a taken branch of a branch instruction prior to the target address being computed during execution of the branch instruction. Although the branch target predictor 104 is shown as a subcomponent of the branch predictor 102, it is understood that the branch target predictor 104 can also be implemented as a separate component.

The branch target predictor 104 maintains a branch target buffer 106. The branch target 106 is typically a portion of dedicated memory (e.g., a cache) that stores the target address of a taken branch of a branch instruction, hereinafter referred to as a "branch target address." Each entry in the branch target buffer 106 includes an identifier field. In some embodiments, the identifier comprises an instruction address for a corresponding branch instruction (e.g., a "branch instruction address"). In other embodiments, the identifier field includes a prediction address. The prediction address comprises a program counter at the head of speculation (e.g., a most recent program counter in the processor pipeline). The prediction address serves as the start address of a predicted block being predicted. Accordingly, each entry in the branch target buffer 106 is indexed according to the identifier field.

Each entry in the branch target buffer 106 also includes a target field. A target field of a branch target buffer 106 entry stores an identifier of the branch target address for the corresponding branch instruction. The branch target address comprises a start address of a predicted block. A predicted block is a block of consecutive instruction bytes that can be fetched by the instruction fetch unit. Each predicted block must be contained within a certain memory region called a prediction window. In some embodiments, a prediction window includes a cache line. In some embodiments, a predicted block is specified by (e.g., indicated in the branch target buffer 106 entry) 1) a start address specifying a first byte of the predicted block within the memory space, thus specifying the predicted block is part of, 2) an end address (e.g., an offset within the prediction window), and 3) one or more branch types specifying whether each branch within the predicted block is a call, return, or a jump (e.g., a branch that is neither a call or return). In some embodiments, each branch target buffer 106 entry also indicates whether each branch is predicted to be taken or not. These entry attributes are described in further detail below.

Existing approaches for implementing branch target buffers require that a branch target buffer entry store an identifier of a single branch target address, or require that pairs of branch target address be in the same predicted block (e.g., same-pBlock nPairs). In contrast, entries of the branch target buffer 106 configured for merged branch target buffer entries store identifiers for one or more branches (e.g., one or more branch target addresses), allowing for multiple branch target addresses to be referenced in a single entry that need not be in the same predicted block. For example, assuming a 32-bit target field of a branch target buffer 106 entry, a single branch target address is referenced using up to 32 bits. An entry referencing two branch target addresses allocates a first subset of bits in the target field (e.g., the first 16 bits) to a first branch target address and a second subset of bits in the target field (e.g., the second 16 bits) to a second branch target address. The target field of the branch target buffer 106 also includes, for each referenced branch target address, an identifier of a last byte of a predicted block beginning at the corresponding branch target address.

The bits of the target field allocated to a given branch target address are the lowest-order bits of the given branch target address. To compute the given branch target address, the remaining bits of the given branch target address (e.g., the highest order bits) are copied from the highest order bits of the branch instruction address of the entry. For example, assuming 32-bit addressing and that 16 bits of a target field are allocated to a given branch target address, the given branch target address would be calculated as the first 16 bits (e.g., the 16 highest order bits) of the branch instruction address appended with the 16 bits allocated in the target field. As another example, assuming 32-bit addressing and that 20 bits of a target field are allocated to a given branch target address, the given branch target address would be calculated as the first 12 bits (e.g., the 12 highest order bits) of the branch instruction address appended with the 20 bits allocated in the target field. Readers will appreciate that bits in the target field can be allocated equally amongst identified branch target addresses, or allocated unequally (e.g., a first branch target address can be allocated 20 bits while a second branch target address can be allocated 12 bits).

In some embodiments, for a first branch "Br0", an entry has a "sequential before" attribute specifying whether the branch target address is in the same prediction window as the prediction address or whether it is N prediction windows later. For example, where Br0 is in the next prediction window (i.e. SequentialBefore=1), then the branch predictor 102 would predict a first predicted block Pblk0 starting at the prediction address and ending at the end of the prediction window containing the prediction address (Pw0). Simultaneously, the branch predictor 102 would predict a second predicted block Pblk1 starting at the beginning of the subsequent prediction window (Pw1). Pblk1 contains Br0. If Br0 is predicted taken, Pblk1 ends on the last byte of Br0. Otherwise, Pblk1 may contain bytes up until the last byte of Pw1.

For a second branch in an entry "Br1," the entry specifies whether the branch is (a) on the taken path of Br0 or (b) on the non-taken path of Br0. In both cases, the entry specifies whether Br1 is in the prediction window at the taken/non taken target of Br0 or in a subsequent prediction window. Br1 is predicted as follows:

If Br1 is on the taken path of Br0 and Br0 is predicted non taken, Br1 is not used for the prediction.

If Br1 is on the non-taken path of Br0 and Br0 is predicted taken, Br1 is not used for the prediction.

If Br1 is on the taken path of Br0 and Br0 is predicted taken, Br1 is used for the prediction. For example, assuming PblkN ends on the last byte of Br0, then the prediction engine will predict PblkN+1 which starts at the target address of Br0. Br1 has a SequentialBefore attribute specifying whether it is in the prediction window at the target of Br0 or in a subsequent prediction window. If SequentialBefore=0, then Br1 is part of PblkN+1. Otherwise PblkN+1 does not contain any predicted branch and it ends on the last byte of the prediction window.

If Br1 is on the non-taken path of Br0 and Br0 is predicted non taken, Br1 is used for the prediction. Br1 may be in the same prediction window as Br0, in which case it factors into the same Pblk as Br0. Or it can be in one of the subsequent prediction window as specified by SequentialBefore attribute. For example, where Br0 is in PblkN. Br1 SequentialBefore=0 means that Br1 is in the same prediction window as Br0. Br1SequentialBefore=M means that Br1 is in M prediction windows after Br0. If M=2, then the prediction engine will predict simultaneously:

PblkN which contains Br0 and ends on the last byte of the prediction window containing Br0 (namely PwN).

PblkN+1 which consists of the full prediction window immediately after PwN, i.e. PwN+1

PblkN+2 which starts on the first byte of PwN+2 and contains Br1. If Br1 is predicted taken, PblkN+2 ends on the last byte of Br1. Otherwise, it may contain bytes up until the last byte of PwN+2.

Each entry may store information for more than two branches. For each branch Br_i, there are attributes to specify the following properties:

Br_i is on the taken or non-taken path of another branch Br_j (j<i)

Br_i SequentialBefore which specifies the number of prediction windows without branches that separate Br_i and Br_j End Address of Br_i within the prediction window Branch type of Br_i As set forth above, entry in the branch target buffer 106 also stores, in a "branch type field," for each branch target address identified in the target field, an identifier of a branch type for the corresponding branch instruction. For example, assume that a branch instruction falls in to one of a predefined enumerations of branch types. A branch type can indicate a particular type of branch instruction, as well as a relationship between that branch and other branches referenced in the entry. Assuming that a branch target buffer 106 entry supports up to two branch target addresses in the target field corresponding to a first branch instruction "Br0" and a second branch instruction "Br1," the branch type field can indicate for "Br0" the type of instruction (e.g., call, conditional jump, unconditional jump, variable or fixed target, etc.) and whether "Br0" exists, and whether "Br1" is on the taken path of "Br0," is on the untaken path of "Br0," is in the same prediction window as "Br0" (e.g., is in a block of instructions accessed when loading from the branch target address for "Br0"), etc.).

In some embodiments, The Br0SequentialBefore attribute has a maximum value which determines how many predicted blocks without branches are predicted when missing in the branch target buffer 106. For example, if Br0SequentialBefore is set to have a maximum value of 2, then every prediction flow which misses in the branch target buffer 106 can predict 3 predicted blocks: the first predicted block starts at the prediction address and ends on the last byte of the prediction window, the second and third predicted blocks are the next two full prediction windows. The next prediction flow will use a prediction address which is the first byte of the prediction window subsequent to the last predicted block predicted. This is significant since it enables increasing the prediction bandwidth and reducing the power it takes to predict a predicted block even in code that does not have many branches.

Accordingly, the branch type field then includes a number of bits required to express any branch type in the enumeration multiplied by a number of branch target address encodings. For example, assume that a branch instruction falls into one of fourteen different branch types requiring four bits to express. Assuming that up to two branch target instructions can be identified in the target field, the branch type field then includes 2*4=8 bits.

When the branch target predictor 104 is queried with the prediction address corresponding to the first branch instruction (e.g., the prediction address before the first branch instruction), or the first branch instruction address, depending on which is used to index entries in the branch target buffer 106. If no such entry is found, the branch instruction proceeds through the instruction pipeline for execution. If an entry is found, the entry is accessed by the branch target predictor 104.

The branch target predictor 104 computes branch target addresses for each branch target address referenced in the target field of the entry. For example, assuming a first branch target address referenced by a first portion of bits and a second branch target address by a second portion of bits, the branch target predictor 104 calculates the first branch target address by appending the first portion of bits onto a number of highest order bits in the branch instruction address required to meet a number of bits in an instruction address. The branch target predictor 104 calculates the second branch target address by appending the second portion of bits onto a number of highest order bits in the branch instruction address required to meet a number of bits in an instruction address. The branch target predictor 104 then stores the computed branch target addresses (e.g., the first branch target address and second branch target address) in a prediction queue 108. For example, the branch target predictor stores, for each branch target address (e.g., for the first branch target address and a second branch target address) a corresponding predicted block. A predicted block includes a start address (e.g., the branch target address) and a series of instruction addresses ending at an end address. The end address of a predicted block is identified in the branch target buffer entry (e.g., using an offset or number of instructions to determine the end address, or an identifier of an address for the last instruction in the predicted block), or a default end address corresponding to the beginning of a new prediction window of instructions.

The prediction queue 108 is a portion of memory allocated to maintain a queue of predicted blocks of instructions (e.g., branch target addresses and subsequent instructions in the same predicted block). The prediction queue 108 is communicatively coupled to an instruction fetch unit 114. The instruction fetch unit 114 loads from memory one or more instructions and store the loaded instructions in an instruction queue 112. Accordingly, the instruction fetch unit 114 accesses the prediction queue 108 for a branch target address and load, into the instruction queue 112, a plurality of instructions beginning at the branch target address. In some embodiments, the number of sequential blocks of instructions (e.g., predicted blocks) inserted into the instruction queue 112 is equal to a defined maximum value for a number of predicted blocks that can be inserted for a branch target buffer 106 entry hit. For example, the instruction fetch unit 114 loads a block of instructions beginning at the branch target address to fill a cache line of the instruction queue 112. Such a block of addresses is referred to as a predicted block. As a plurality of branch target addresses (e.g., a plurality of predicted blocks) have been added to the prediction queue 108 in response to the single access of the branch target buffer 106, the branch prediction throughput is increased, enabling more instructions to be fetched and executed each cycle. Instructions from the instruction queue 112 are then provided by the instruction fetch unit 114 to the decode unit 116 and executed by the execution unit 118.

To generate a merged branch target buffer 106 entry, the branch target predictor 104 receives a first redirect (e.g., from the decode unit 116 or the execution unit 118) for a first branch instruction. For example, the first time the first branch instruction is fetched, no entry in the branch target buffer 106 would exist. Accordingly, the first branch target address for the first branch instruction would be computed by the decode unit 116 and/or the execution unit 118, depending on whether the first branch was conditional and indirect. Accordingly, the redirect to the branch target predictor 104 includes a description of the first branch instruction (e.g., a branch type), the first branch instruction address, and the first branch target address. The branch target predictor 104 then stores, in the branch target buffer 106, an entry identifying the branch instruction address in the identifier field and the branch target address in the target field. The generated entry also identifies, in the branch type field, a type of branch for the first branch instruction. As no other branch instructions are referenced in the target field, the type field would not reflect a relationship between the first branch instruction and another branch instruction.

The branch target predictor 104 then receives a second redirect for a second branch instruction. The second redirect includes a description of the second branch instruction (e.g., a branch type), the second branch instruction address, and the second branch target address. The branch target predictor 104 then determines whether to modify the entry (e.g., the type field, identifier field and target field of the entry) to identify the second branch target address as well as the first branch target address. For example, the branch target predictor 104 determines, based on one or more merging rules, to modify the entry to identify the second branch target address as well as the first branch target address.

The merging rules can be based on the instruction address for the second branch instruction. For example, the branch target predictor 104 can determine to modify the entry to identify the second branch target address as well as the first branch target address in response to the instruction address for the second branch instruction being included in a prediction window for the first branch target address. For example, assume that the instruction fetch unit 114 loads, into the instruction queue 112, a 64-byte block of instructions beginning at a given target address. Accordingly, each branch target address corresponds to a 64 byte prediction window. The instruction address for the second branch instruction is within the prediction window of the first branch target address where the second branch instruction address is within 64 bytes of the first branch target address. The branch target predictor 104 can also determine to modify the entry to identify the second branch target address as well as the first branch target address in response to the instruction address for the second branch instruction being included in a next prediction window (e.g., a next 64-byte block) after the prediction window for the first branch target address.

The merging rules can also be based on branch types for the first branch instruction and the second branch instruction. For example, particular combinations of branch instructions can be preferentially selected for modifying the entry to identify the second branch target address as well as the first branch target address. The merging rules can also prevent modifying the entry to identify the second branch target address as well as the first branch target address for certain combinations of branch types. As a non-limiting example, where the first branch instruction is a call, the merging rules can prevent modifying the entry when the second branch instruction is a call or a return in order to avoid any call/call, call/ret, ret/call, ret/ret combination which are not supported by the return address stack.

The branch target predictor 104 also determines to modify the entry to identify the second branch target address as well as the first branch target address based on a number of bits required to identify, in the entry (e.g., the target field), the first branch target address and the second branch target address. For example, assume a 32-bit addressing scheme where the first branch target address and the first branch instruction address share the same 16 highest order bits, but differ beginning at the $17^{th}$ highest order bit. Accordingly, the first branch target address requires 16 bits of the target field to be identified. Where the second branch target address differs from the first branch instruction address beginning at the $13^{th}$ bit highest order bit, the second branch target address requires 12 bits to be identified in the target field. Accordingly, a 32 bit target field can indicate the first branch target address (using the 16 lowest order bits of the first branch target address) and the second branch target address (using the 12 lowest order bits of the second branch target address).

In contrast, assume that the second branch target address differs from the first branch instruction address (used to index the entry) beginning at the 21st bit, the second branch target address requires 20 bits to be identified in the target field. As the first branch target address requires 16 bits, both the first branch target address and the second branch target address cannot be expressed in the target field. Accordingly, the branch target predictor 106 would determine not to modify the entry. Where it is determined not to modify the entry, a new entry for the second branch instruction would instead be created in the branch target buffer 106.

Modifying the entry to identify the second branch target address and the first branch target address includes adding, to the target field of the entry, a number of lowest order bits of the second branch target address beginning at the first bit that differs from the first branch instruction address. Modifying the entry to identify the second branch target address and the first branch target address includes adding, to the branch type field, an indication of the second branch type and modifying the branch type field to reflect the relationship between the first branch target instruction and the second branch target instruction.

For further examples regarding merging rules, assume that each entry can record two branches (Br0 and Br1) and that SequentialBefore maximum is one so that two Pblks get generated when missing in the branch target buffer 106. Further assume that prediction windows are 64 byte aligned lines of memory. Each predicted block gets assigned the following properties:
  Prediction address used to look up the BTB when predicting the Pblk
  End address of the branches found in the BTB when predicting the Pblk
  Descriptor specifying the position of the predicted block with respect to each branch found in the BTB when predicting the Pblk.

For this example, assuming prediction address=0x005, and assuming that types and target size of branches always enable pairing two branches into a single entry:
  A prediction miss in the branch target buffer 106 generates Pblk0 with StartAddr=0x005, EndAddr=0x03f and Pblk1 with StartAddr=0x040, EndAddr=0x07f.
    A redirect on Pblk0 for BrA with EndOffset=0x07 would cause BrA to be trained at the prediction address as Br0 with SequentialBefore=0
    A redirect on Pblk1 for BrB with EndOffset=0x01 would cause BrB to be trained at the prediction address as Br0 with SequentialBefore=1
  Prediction hits a branch target buffer 106 entry with a single branch Br0 with SequentialBefore=0, EndOffset=0x3e, TgtAddr=0x102, and it predicts Br0 taken. It generates Pblk0 with StartAddr=0x005, EndAddr=0x03e and Pblk1 with StartAddr=0x102, EndAddr=0x13f.
    A redirect on Pblk1 for BrC with EndOffset=0x03 would cause BrC to be trained at the prediction address as Br1 with SequentialBefore=0, Br1 on taken path of Br0.
  Prediction hits a branch target buffer 106 entry with a single branch Br0 with SequentialBefore=0, EndOffset=0x2e, TgtAddr=0x102, and it predicts Br0 non taken. It generates Pblk0 with StartAddr=0x005, EndAddr=0x03f and Pblk1 with StartAddr=0x040, EndAddr=0x07f.
    A redirect on Pblk0 for BrD with EndOffset=0x34 would cause BrD to be trained at the prediction address as Br1 with SequentialBefore=0, Br1 on non-taken path of Br0.
    A redirect on Pblk1 for BrE with EndOffset=0x05 would cause BrE to be trained at the prediction address as Br1 with SequentialBefore=1, Br1 on non-taken path of Br0.

Figure 2:
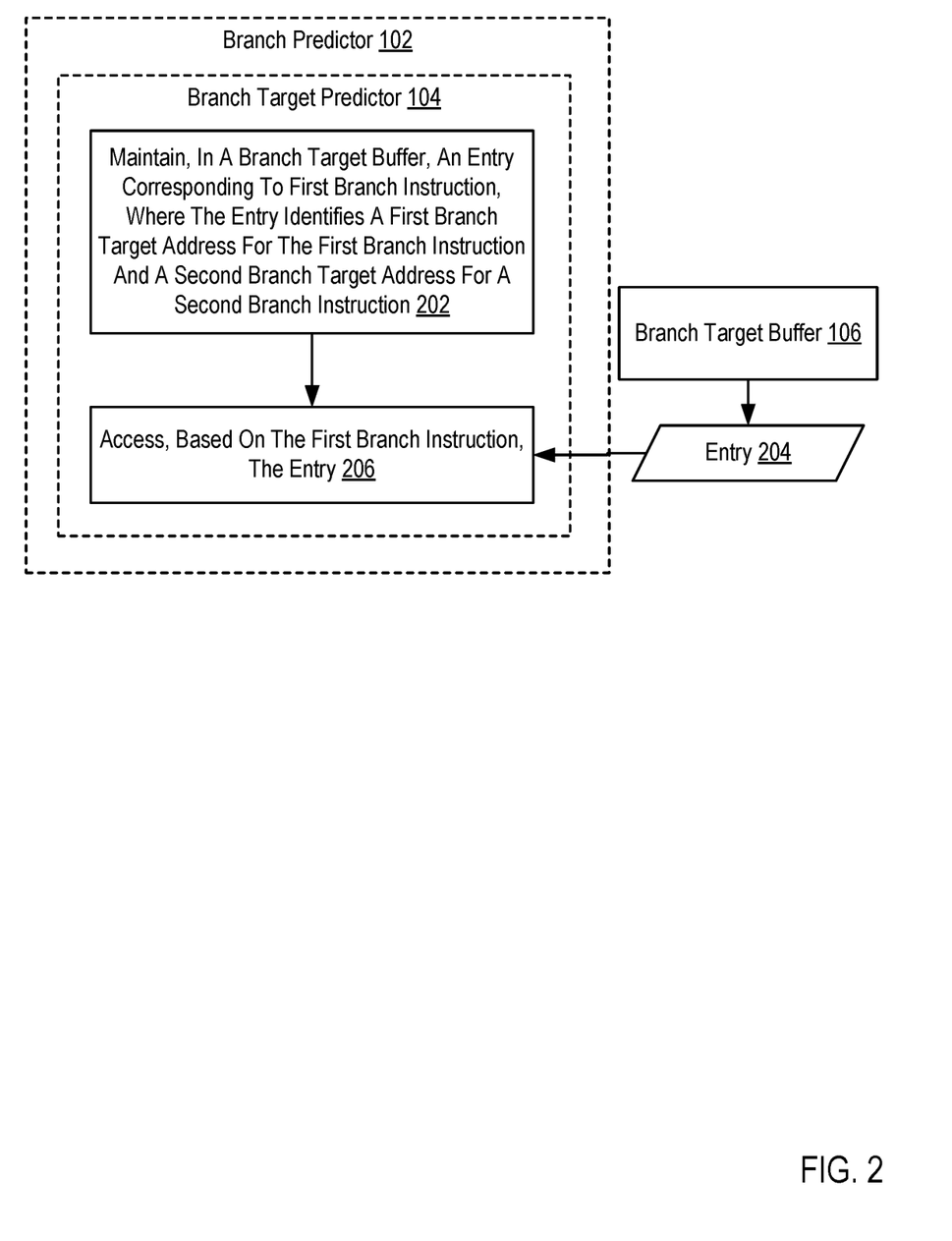
FIG. 2 is a flowchart of an example method for merged branch target buffer entries according to some embodiments.

For further explanation, FIG. 2 sets forth a flow chart illustrating an exemplary method for merged branch target buffer entries that includes maintaining 202 (e.g., by a branch target predictor 104 of a branch predictor 102), in a branch target buffer 106, an entry 204 corresponding to a first branch instruction, wherein the entry 204 identifies a first branch target address for the first branch instruction and a second branch target address for a second branch instruction. Each entry in the branch target buffer 106 includes an identifier field storing an identifier, such as a branch target address or a prediction address. Accordingly, each entry in the branch target buffer 106 is indexed according to the identifier field.

Each entry in the branch target buffer 106 also includes a target field. Accordingly, the target field identifies the first branch target address for the first branch instruction and the second branch target address for the second branch instruction. The bits of the target field allocated to a given branch target address are the lowest-order bits of the given branch target address. To compute the given branch target address, the remaining bits of the given branch target address (e.g., the highest order bits) are copied from the highest order bits of the branch instruction address of the entry (e.g., of the identifier field). For example, assuming 32-bit addressing and that 16 bits of a target field are allocated to the first branch target address, the first branch target address would be calculated as the first 16 bits (e.g., the 16 highest order bits) of the branch instruction address appended with the 16 bits allocated in the target field. Readers will appreciate that bits in the target field can be allocated equally amongst identified branch target addresses, or allocated unequally (e.g., a first branch target address can be allocated 20 bits while a second branch target address can be allocated 12 bits).

Each entry in the branch target buffer 106 also stores, in a "branch type field," for each branch target address identified in the target field, an identifier of a branch type for the corresponding branch instruction. For example, assume that a branch instruction falls in to one of a predefined enumerations of branch types. A branch type can indicate a particular type of branch instruction, as well as a relationship between that branch, the prediction address and other branches referenced in the entry. Assuming that a branch target buffer 106 entry supports up to two branch target addresses in the target field corresponding to a first branch instruction "Br0" and a second branch instruction "Br1," the branch type field can indicate for "Br0" the type of instruction (e.g., call, conditional jump, unconditional jump, variable or fixed, etc.) and whether "Br0" exists, whether "Br0" is in the prediction window pointed to by the prediction address or a subsequent prediction window, whether "Br1" is on the taken bath of "Br0," is on the untaken path of "Br0," is in the same prediction window as "Br0" (e.g., is in a block of instructions accessed when loading from the branch target address for "Br0"), etc.).

The method of FIG. 2 also includes accessing 206 (e.g., by a branch target predictor 104 of a branch predictor 102), based on the first branch instruction, the entry 204. For example, the branch target predictor 104 is queried with the prediction address corresponding to the first branch instruction (e.g., the prediction address before the first branch instruction), or the first branch instruction address, depending on which is used to index entries in the branch target buffer 106. The branch target predictor 104 then identifies, as the entry 204, a corresponding entry in the branch target buffer 106.

Figure 3:
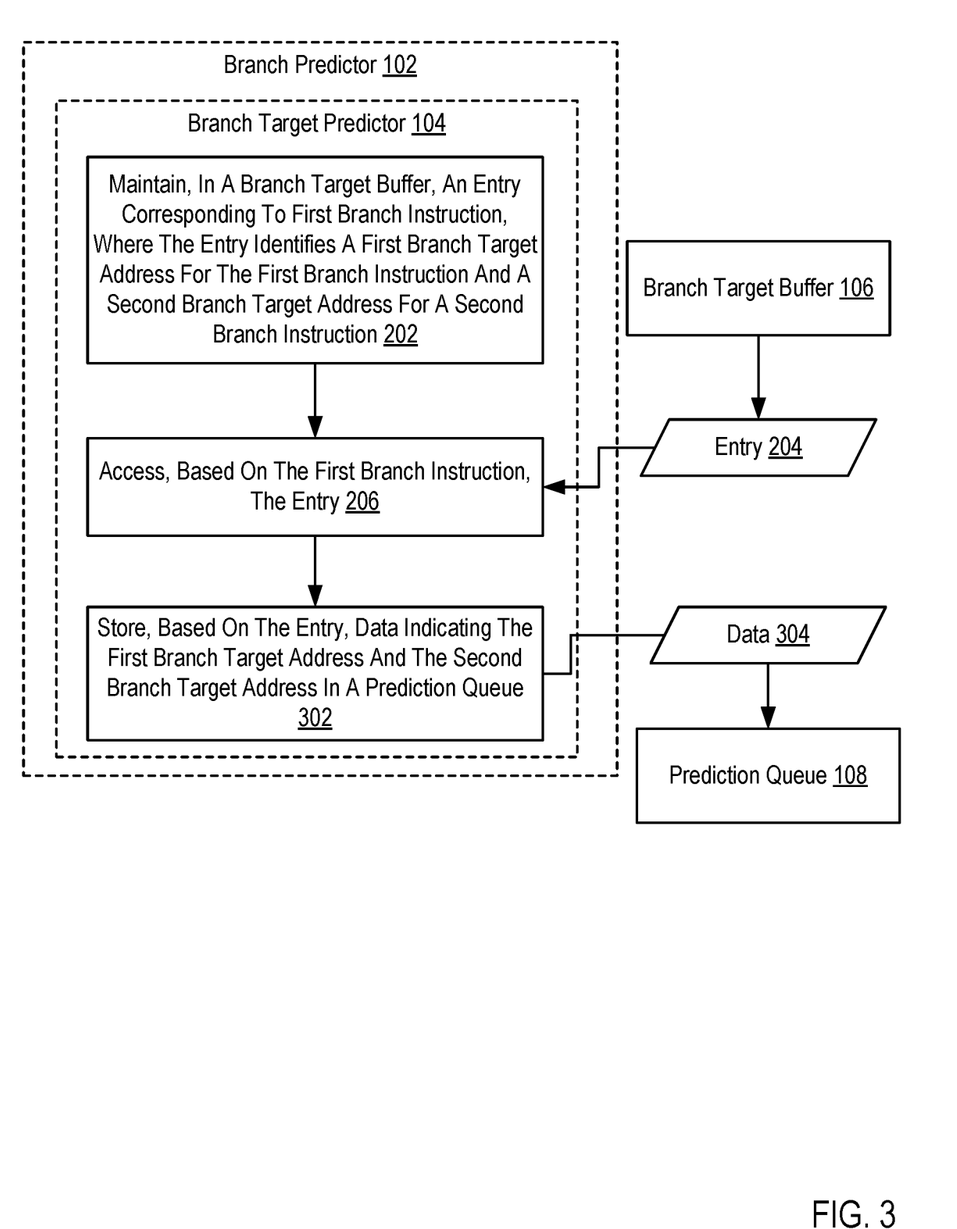
FIG. 3 is a flowchart of an example method for merged branch target buffer entries according to some embodiments.

For further explanation, FIG. 3 sets forth a flow chart illustrating an exemplary method for merged branch target buffer entries that includes maintaining 202 (e.g., by a branch target predictor 104 of a branch predictor 102), in a branch target buffer 106, an entry 204 corresponding to a first branch instruction, wherein the entry 204 identifies a first branch target address for the first branch instruction and a second branch target address for a second branch instruction; and accessing 206 (e.g., by a branch target predictor 104 of a branch predictor 102), based on the first branch instruction, the entry 204.

The method of FIG. 3 differs from FIG. 2 in that the method of FIG. 3 also includes storing 302, based on the entry 204, data 304 indicating the first branch target address and the second branch target address in a prediction queue 108. The prediction queue 108 is a portion of memory allocated to maintain a queue of branch target addresses (e.g., predicted blocks of addresses). The prediction queue 108 is communicatively coupled to an instruction fetch unit 114. The instruction fetch unit 114 loads from memory one or more instructions and store the loaded instructions in an instruction queue 112. Accordingly, the instruction fetch unit 114 accesses the prediction queue 108 for a branch target address and load, into the instruction queue 112, a plurality of instructions beginning at the branch target address. For example, the instruction fetch unit 114 loads a block of instructions beginning at the branch target address to fill a cache line of the instruction queue 112. Such a block of addresses is referred to as a prediction block. As a plurality of branch target addresses have been added to the prediction queue 108 in response to the single access of the branch target buffer 106, multiple prediction blocks can be stored in the instruction queue 112 by the instruction fetch unit 114. This increases efficiency as more instructions can be fetched in a given cycle.

The branch target predictor 104 computes the first branch target address and the second branch target address based on the target field of the entry 204. For example, assuming the first branch target address is referenced by a first portion of bits and the second branch target address by the second portion of bits, the branch target predictor 104 calculates the first branch target address by appending the first portion of bits onto a number of highest order bits in the branch instruction address required to meet a number of bits in an instruction address. The branch target predictor 104 calculates the second branch target address by appending the second portion of bits onto a number of highest order bits in the branch instruction address required to meet a number of bits in an instruction address. The branch target predictor 104 then stores the computed branch target addresses (e.g., the first branch target address and second branch target address) in the prediction queue 108.

Figure 4:
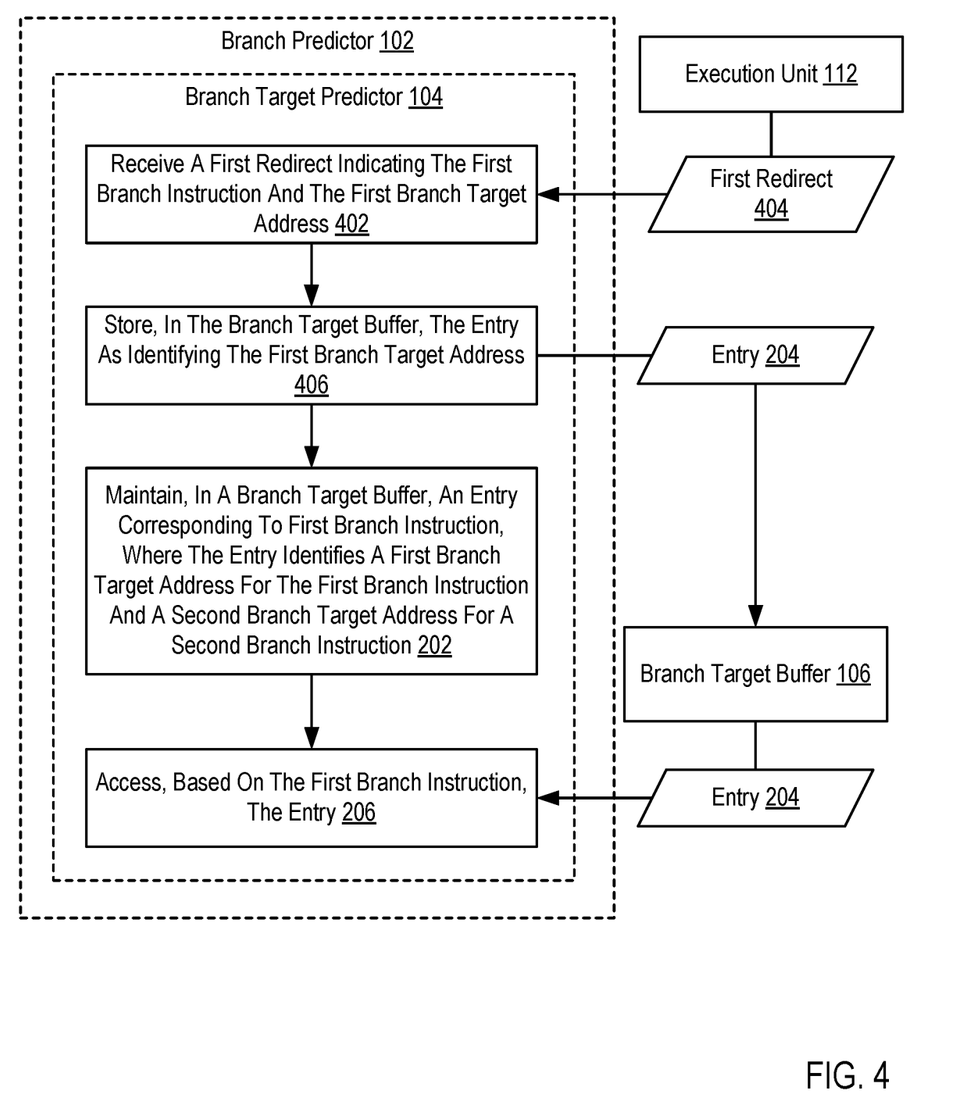
FIG. 4 is a flowchart of an example method for merged branch target buffer entries according to some embodiments.

For further explanation, FIG. 4 sets forth a flow chart illustrating an exemplary method for merged branch target buffer entries that includes maintaining 202 (e.g., by a branch target predictor 104 of a branch predictor 102), in a branch target buffer 106, an entry 204 corresponding to a first branch instruction, wherein the entry 204 identifies a first branch target address for the first branch instruction and a second branch target address for a second branch instruction; and accessing 206 (e.g., by a branch target predictor 104 of a branch predictor 102), based on the first branch instruction, the entry 204.

The method of FIG. 4 differs from FIG. 2 in that the method of FIG. 4 also includes receiving 402 (e.g., by a branch target predictor 104 of a branch predictor 102, from an execution unit 112), a first redirect 404 indicating the first branch instruction and the first branch instruction address. For example, the first time the first branch instruction is fetched, no entry in the branch target buffer 106 would exist. Accordingly, the first branch target address for the first branch instruction would be computed by the decode unit 116 and/or the execution unit 118, depending on whether the first branch was conditional and indirect. Accordingly, the first redirect 404 to the branch target predictor 104 includes a description of the first branch instruction (e.g., a branch type), the first branch instruction address, and the first branch target address.

The method of FIG. 4 also includes storing 406 (e.g., by a branch target predictor 104 of a branch predictor 102) the entry 204 as identifying the first branch target address. For example, the entry 204 is stored identifying the first branch instruction address in the identifier field and the first branch target address in the target field. The generated entry also identifies, in the branch type field, a type of branch for the first branch instruction which includes information about whether the first branch target address is in the same prediction window as the first branch instruction address or in a subsequent prediction window. As no other branch instructions are referenced in the target field, the type field would not reflect a relationship between the first branch instruction and another branch instruction (e.g., the second branch instruction).

Figure 5:
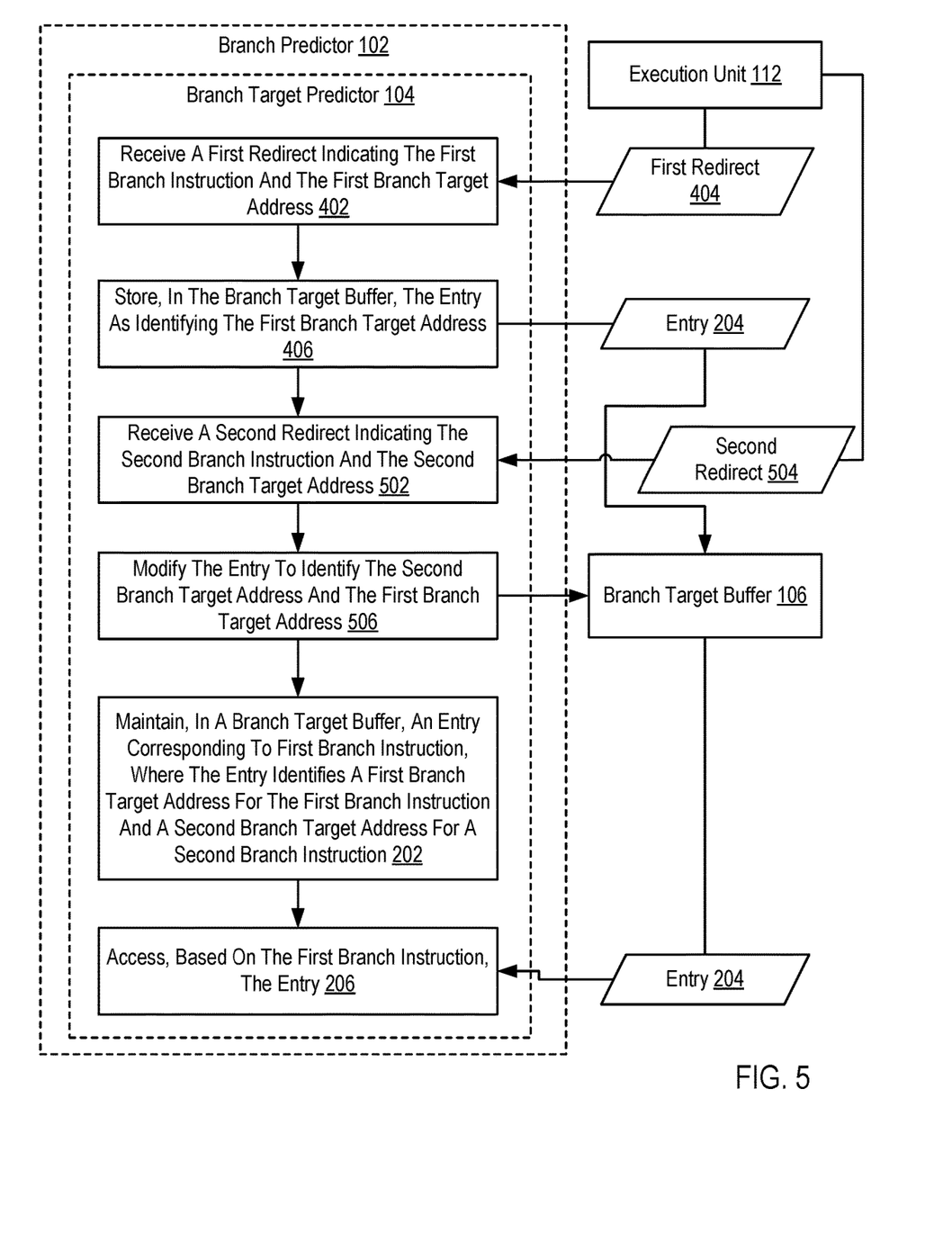
FIG. 5 is a flowchart of an example method for merged branch target buffer entries according to some embodiments.

For further explanation, FIG. 5 sets forth a flow chart illustrating an exemplary method for merged branch target buffer entries that includes receiving 402 (e.g., by a branch target predictor 104 of a branch predictor 102, from an execution unit 112), a first redirect 404 indicating the first branch instruction and the first branch instruction address; storing 406 (e.g., by a branch target predictor 104 of a branch predictor 102) the entry 204 as identifying the first branch target address; maintaining 202 (e.g., by a branch target predictor 104 of a branch predictor 102), in a branch target buffer 106, an entry 204 corresponding to a first branch instruction, wherein the entry 204 identifies a first branch target address for the first branch instruction and a second branch target address for a second branch instruction; and accessing 206 (e.g., by a branch target predictor 104 of a branch predictor 102), based on the first branch instruction, the entry 204.

The method of FIG. 5 differs from FIG. 4 in that the method of FIG. 5 also includes receiving 502 (e.g., by a branch target predictor 104 of a branch predictor 102, from an execution unit 112) a second redirect 504 indicating the second branch instruction and the second branch target address. The second redirect 504 includes a description of the second branch instruction (e.g., a branch type), information whether the second branch target instruction is at the taken path of the first branch or the non-taken path of the first branch, whether the second branch target instruction is in the same prediction window as the first branch target instruction or in a subsequent prediction window, the second branch instruction address, and the second branch target address.

The method of FIG. 5 also includes modifying 506 (e.g., by the branch target predictor 104 of the branch predictor 102) the entry 205 to identify the second branch target address and the first branch target address. Modifying 506 the entry 204 to identify the second branch target address and the first branch target address includes adding, to the target field of the entry 204, a number of lowest order bits of the second branch target address beginning at the first bit that differs from the first branch instruction address. Modifying 506 the entry 204 to identify the second branch target address and the first branch target address includes adding, to the branch type field of the entry 204, and indication of the second branch type and modifying the branch type field to reflect the relationship between the first branch target instruction and the second branch target instruction.

Figure 6:
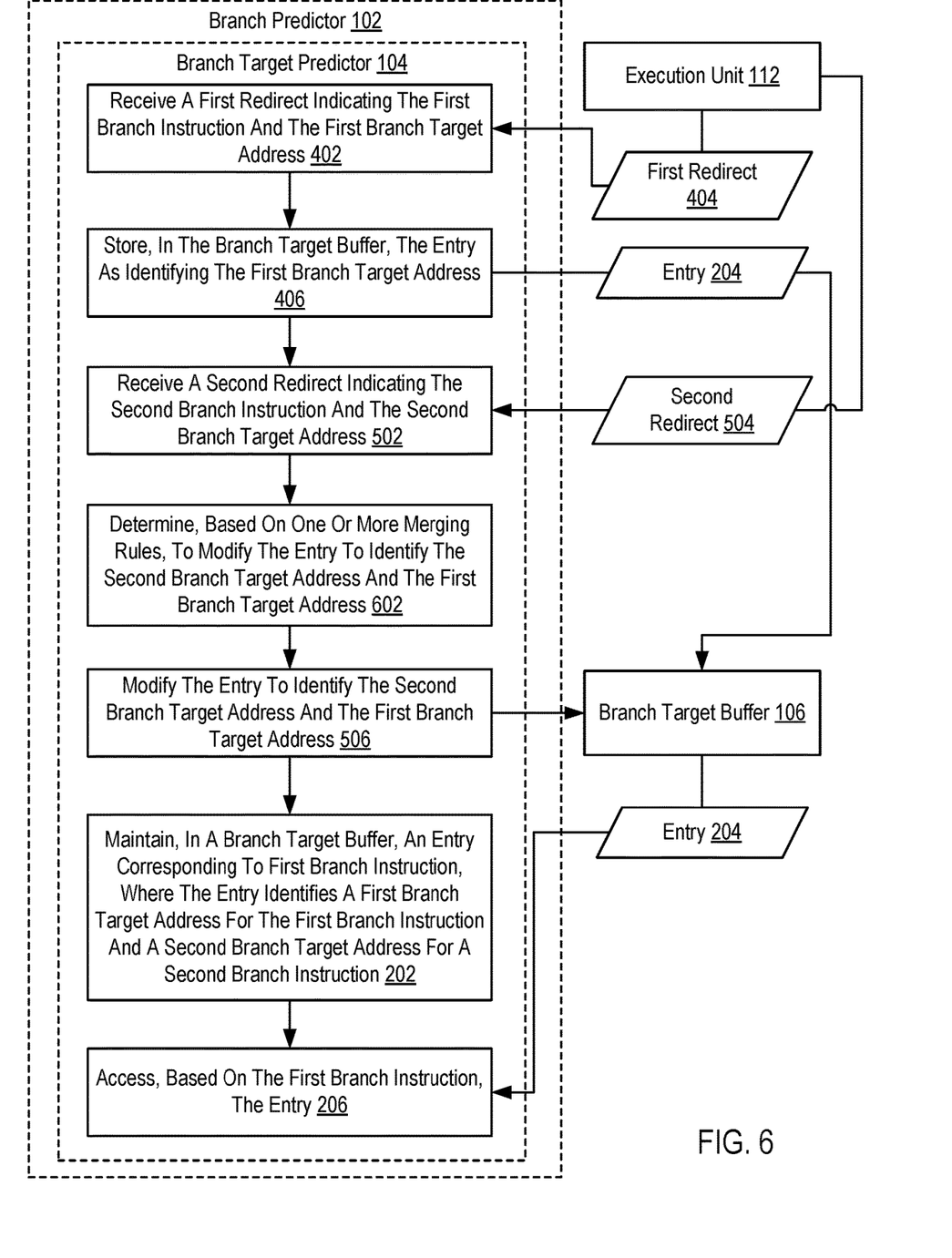
FIG. 6 is a flowchart of an example method for merged branch target buffer entries according to some embodiments.

For further explanation, FIG. 6 sets forth a flow chart illustrating an exemplary method for merged branch target buffer entries that includes receiving 402 (e.g., by a branch target predictor 104 of a branch predictor 102, from an execution unit 112), a first redirect 404 indicating the first branch instruction and the first branch instruction address; storing 406 (e.g., by a branch target predictor 104 of a branch predictor 102) the entry 204 as identifying the first branch target address; receiving (e.g., by a branch target predictor 104 of a branch predictor 102, from an execution unit 112) a second redirect 504 indicating the second branch instruction and the second branch target address; modifying 506 (e.g., by the branch target predictor 104 of the branch predictor 102) the entry 205 to identify the second branch target address and the first branch target address; maintaining 202 (e.g., by a branch target predictor 104 of a branch predictor 102), in a branch target buffer 106, an entry 204 corresponding to a first branch instruction, wherein the entry 204 identifies a first branch target address for the first branch instruction and a second branch target address for a second branch instruction; and accessing 206 (e.g., by a branch target predictor 104 of a branch predictor 102), based on the first branch instruction, the entry 204.

The method of FIG. 6 differs from FIG. 5 in that the method of FIG. 6 also includes determining 602 (e.g., by a branch target predictor 104 of a branch predictor 102) to modify the entry 204 (e.g., the target field of the entry 204) to identify the second branch target address as well as the first branch target address. For example, the branch target predictor 104 determines, based on one or more merging rules, to modify the entry to identify the second branch target address as well as the first branch target address.

The merging rules can be based on the instruction address for the second branch instruction. For example, the branch target predictor 104 determines to modify the entry to identify the second branch target address as well as the first branch target address in response to the instruction address for the second branch instruction being included in a prediction window for the first branch target address. For example, assume that the instruction fetch unit 114 loads, into the instruction queue 112, a 64-byte block of instructions beginning at a given target address. Accordingly, each branch target address corresponds to a 64 byte prediction window. The instruction address for the second branch instruction is within the prediction window of the first branch target address where the second branch instruction address is within 64 bytes of the first branch target address. The branch target predictor 104 can also determine to modify the entry to identify the second branch target address as well as the first branch target address in response to the instruction address for the second branch instruction being included in a next prediction window (e.g., a next 64-byte block) after the prediction window for the first branch target address.

The merging rules can also be based on branch types for the first branch instruction and the second branch instruction. For example, particular combinations of branch instructions can be preferentially selected for modifying the entry to identify the second branch target address as well as the first branch target address. The merging rules can also prevent modifying the entry to identify the second branch target address as well as the first branch target address for certain combinations of branch types. As a non-limiting example, where the first branch instruction is a call, the merging rules can prevent modifying the entry when the second branch instruction is a call or a return in order to avoid any call/call, call/ret, ret/call, ret/ret combination which are not supported by the return address stack. In some embodiments, the defined maximum number of predicted blocks that can be inserted for a branch target buffer 106 entry hit is a limitation for merging.

The branch target predictor 104 also determines 602 to modify the entry to identify the second branch target address as well as the first branch target address based on a number of bits required to identify, in the entry (e.g., the target field), the first branch target address and the second branch target address. For example, assume a 32-bit addressing scheme where the first branch target address is identical to the first branch instruction address in its 16 highest order bits, but differs beginning at the $17^{th}$ bit. Accordingly, the first branch target address requires 16 bits of the target field to be identified. Where the second branch target address differs from the first branch instruction address (used to index the entry) beginning at the $13^{th}$ bit, the second branch target address requires 12 bits to be identified in the target field. Accordingly, a 32 bit target field can indicate the first branch target address (using the 16 lowest order bits of the first branch target address) and the second branch target address (using the 12 lowest order bits of the second branch target address).

In view of the explanations set forth above, readers will recognize that the benefits of merged branch target buffer entries according to embodiments of the present disclosure include in certain embodiments under certain circumstances:

- Improved performance of a computing system by providing improved prediction bandwidth, allowing for multiple blocks of instructions for branch target addresses to be loaded into an instruction queue in a single access of the branch target buffer; and/or
- Improved performance of a computing system by providing increased storage efficiency of the branch target buffer; and/or
- Improved performance of a computing system executing software by generating multiple predicted blocks of instructions from a single branch target buffer entry, improving efficiency and power usage during execution of the software.

Exemplary embodiments of the present disclosure are described largely in the context of a fully functional computer system for merged branch target buffer entries. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

Figure 7:
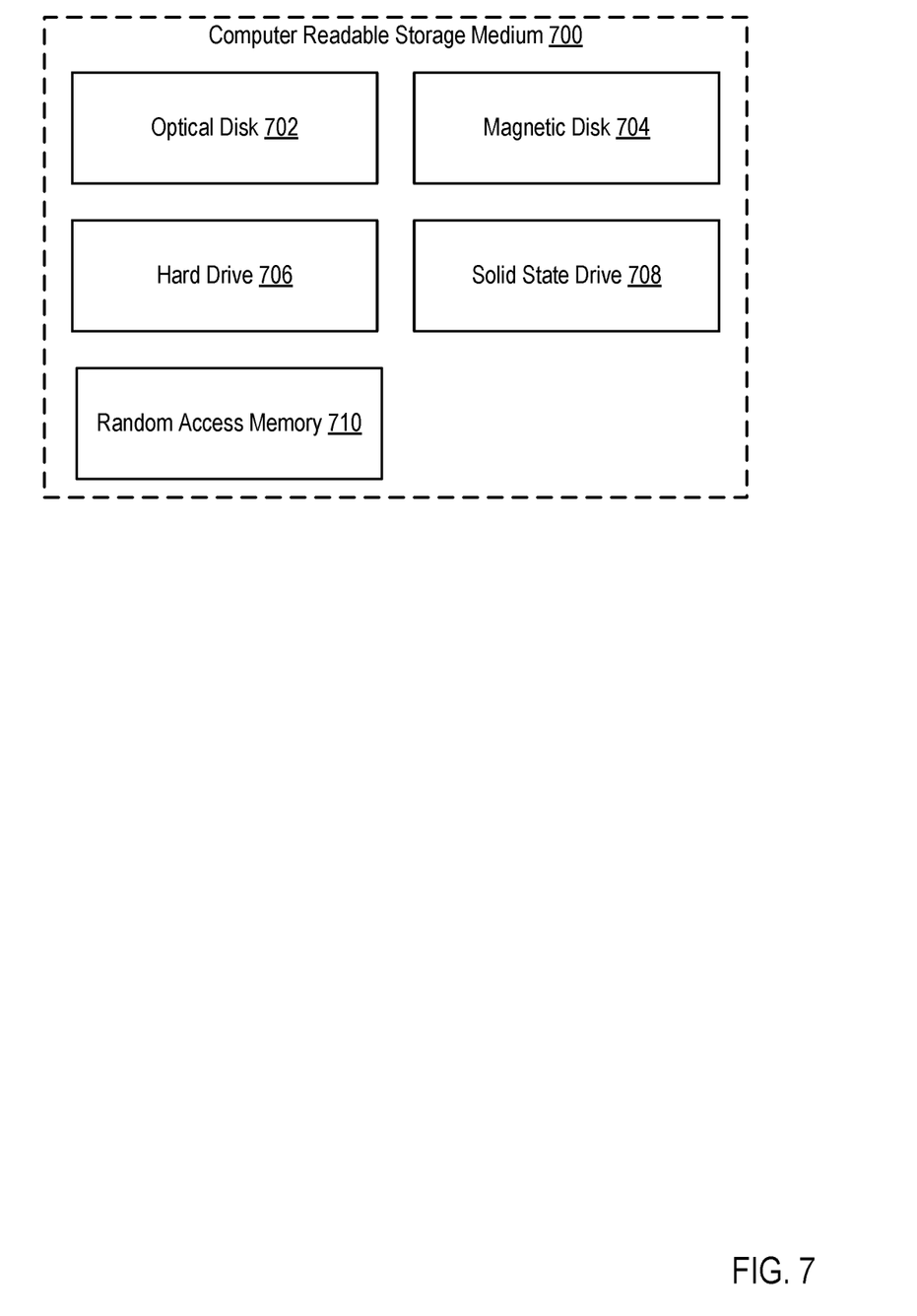
FIG. 7 is an example computer readable storage medium for merged branch target buffer entries according to some embodiments.

FIG. 7 sets forth an example computer readable storage medium 700 according to embodiments of the present disclosure. The example computer readable storage medium 700 of FIG. 7 may include any type of computer readable storage media 700 including optical disks 702 (e.g., Compact Disks (CDs), Digital Versatile Disks (DVDs), Blu-ray disks, etc.), magnetic disks 704 (e.g., floppy disks, zip disks), hard drives 706, solid state drives (SSDs) 708, random access memory (RAM) 710, etc. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The of the computer apparatus (the processor may be embodied as a system on a chip or SoC) may include one or multiple processor cores. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of merged branch target buffer entries, the method comprising:
    maintaining, in a branch target buffer, an entry corresponding to a first branch instruction, wherein the entry comprises a truncated first branch target address for the first branch instruction and a truncated second branch target address for a second branch instruction, wherein the truncated first branch target address and the truncated second branch target address are each allocated a different number of bits within the branch target buffer; and
    accessing, based on the first branch instruction, the entry.

2. The method of claim 1, further comprising storing, based on the entry, data indicating the first branch target address and the second branch target address in a prediction queue.

3. The method of claim 2, wherein the prediction queue is communicatively coupled to an instruction fetch unit configured to load, based on the first branch target address and the second branch target address, a plurality of instructions.

4. The method of claim 1, further comprising:
    receiving a first redirect indicating the first branch instruction and the first branch target address; and
    storing, in the branch target buffer, the entry as identifying the first branch target address.

5. The method of claim 4, further comprising:
    receiving a second redirect indicating the second branch instruction and the second branch target address; and
    modifying the entry to identify the second branch target address and the first branch target address.

6. The method of claim 5, further comprising determining, based on one or more merging rules, to modify the entry to identify the second branch target address and the first branch target address.

7. The method of claim 6, wherein the one or more merging rules are based on at least one of: a branch type for the first branch instruction, a branch type for the second branch instruction, or an instruction address for the second branch instruction being included in a next prediction window succeeding a prediction window for the first branch instruction.

8. The method of claim 6, wherein determining to modify the entry to identify the second branch target address and the first branch target address is further based on a number of bits required to identify, in the entry, the first branch target address and the second branch target address.

9. An apparatus comprising:
    a branch target predictor for merged branch target buffer entries, the branch target predictor configured to:
        maintain, in a branch target buffer, an entry corresponding to a first branch instruction, wherein the entry comprises a truncated first branch target address for the first branch instruction and a truncated second branch target address for a second branch instruction, wherein the truncated first branch target address and the truncated second branch target address are each allocated a different number of bits within the branch target buffer; and
        access, based on the first branch instruction, the entry.

10. The apparatus of claim 9, further configured to store, based on the entry, data indicating the first branch target address and the second branch target address in a prediction queue.

11. The apparatus of claim 10, wherein the prediction queue is communicatively coupled to an instruction fetch unit configured to load, based on the first branch target address and the second branch target address, a plurality of instructions.

12. The apparatus of claim 9, further configured to:
    receive a first redirect indicating the first branch instruction and the first branch target address; and
    store, in the branch target buffer, the entry as identifying the first branch target address.

13. The apparatus of claim 12, further configured to:
    receive a second redirect indicating the second branch instruction and the second branch target address; and
    modify the entry to identify the second branch target address and the first branch target address.

14. The apparatus of claim 13, further configured to determine, based on one or more merging rules, to modify the entry to identify the second branch target address and the first branch target address.

15. The apparatus of claim 14, wherein the one or more merging rules are based on at least one of: a branch type for the first branch instruction, a branch type for the second branch instruction, or an instruction address for the second branch instruction being included in a next prediction window succeeding a prediction window for the first branch instruction.

16. The apparatus of claim 14, wherein determining to modify the entry to identify the second branch target address and the first branch target address is further based on a number of bits required to identify, in the entry, the first branch target address and the second branch target address.

17. A computing device comprising:
    a memory storing computer readable instructions; and
    a processor in communication with said memory and comprising:
        a processor core including:
            a branch target predictor for merged branch target buffer entries, the branch target predictor configured to:
                maintain, in a branch target buffer, an entry corresponding to a first branch instruction of said computer readable instructions, wherein the entry comprises a truncated first branch target address for the first branch instruction and a truncated second branch target address for a second branch instruction, wherein the truncated first branch target address and the truncated second branch target address are each allocated a different number of bits within the branch target buffer; and access, based on the first branch instruction, the entry.

18. The computing device of claim 17 wherein said processor comprises a system on a chip.

19. A method of operating a computing device for improved efficiency, the computing device comprising a memory and a processor in communication with said memory, said memory storing computer readable instructions executing on said processor, said method comprising:

maintaining, in a branch target buffer of said processor, an entry corresponding to a first branch instruction of said computer readable instructions, wherein the entry comprises a truncated first branch target address for the first branch instruction and a truncated second branch target address for a second branch instruction, wherein the truncated first branch target address and the truncated second branch target address are each allocated a different number of bits within the branch target buffer; and accessing, based on the first branch instruction, the entry.

20. The method of claim 19, further comprising storing, based on the entry, data indicating the first branch target address and the second branch target address in a prediction queue.

21. An apparatus for merged branch target buffer entries, comprising:

a processor comprising a branch target predictor configured to:

maintain, in a branch target buffer, an entry corresponding to a first branch instruction, wherein the entry identifies a first branch target address for the first branch instruction and a second branch target address for a second branch instruction, wherein the entry further includes a field identifying a type of instruction for the first branch instruction and a type of relationship between the first branch instruction and the second branch instruction, wherein the type of relationship indicates whether the second branch instruction is on a taken path of the first branch instruction or whether the first branch instruction is on a different prediction window than the second branch instruction; and access, based on the first branch instruction, the entry.

22. The apparatus of claim 21, wherein the branch target predictor is further configured to store, based on the entry, data indicating the first branch target address and the second branch target address in a prediction queue.

23. The apparatus of claim 21, wherein the branch target predictor is further configured to:

receive a first redirect indicating the first branch instruction and the first branch target address; and store, in the branch target buffer, the entry as identifying the first branch target address.

24. The apparatus of claim 21, wherein the branch target predictor is further configured to:

receive a second redirect indicating the second branch instruction and the second branch target address; and modify the entry to identify the second branch target address and the first branch target address.

25. The apparatus of claim 21, wherein the branch target predictor is further configured to determine, based on one or more merging rules, to modify the entry to identify the second branch target address and the first branch target address.

26. The apparatus of claim 25, wherein the one or more merging rules are based on at least one of: a branch type for the first branch instruction, a branch type for the second branch instruction, or an instruction address for the second branch instruction being included in a next prediction window succeeding a prediction window for the first branch instruction.

27. The apparatus of claim 21, wherein determining to modify the entry to identify the second branch target address and the first branch target address is further based on a number of bits required to identify, in the entry, the first branch target address and the second branch target address.

* * * * *